United States Patent
He et al.

(10) Patent No.: US 11,668,582 B2
(45) Date of Patent: Jun. 6, 2023

(54) NAVIGATION SYSTEM AND DISPLAY METHOD OF A NAVIGATION MAP

(71) Applicant: FORD GLOBAL TECHNOLOGIES, LLC, Dearborn, MI (US)

(72) Inventors: Zhiqiang He, Nanjing (CN); Yuan Yan Zhang, Jiangsu (CN); Qinchao Zhou, Shanghai (CN)

(73) Assignee: Ford Global Technologies, LLC, Dearborn, MI (US)

(*) Notice: Subject to any disclaimer, the term of this patent is extended or adjusted under 35 U.S.C. 154(b) by 62 days.

(21) Appl. No.: 17/245,061

(22) Filed: Apr. 30, 2021

(65) Prior Publication Data
US 2021/0341306 A1   Nov. 4, 2021

(30) Foreign Application Priority Data
Apr. 30, 2020   (CN) .......................... 202010364208.7

(51) Int. Cl.
*G01C 21/36* (2006.01)
*B60K 35/00* (2006.01)
(Continued)

(52) U.S. Cl.
CPC .......... *G01C 21/3697* (2013.01); *B60K 35/00* (2013.01); *G01C 21/3667* (2013.01); *G07C 5/0825* (2013.01); *G08G 1/0967* (2013.01); *G09G 5/02* (2013.01); *G09G 5/37* (2013.01); *B60K 2370/152* (2019.05);
(Continued)

(58) Field of Classification Search
CPC ............ G01C 21/3697; G01C 21/3667; G01C 21/3626; G01C 21/3632; G01C 21/3691; G01C 21/367; G01C 21/3641; G01C 21/3647; G01C 21/365; G01C 21/3658; G01C 21/3682; G01C 21/3694; B60K 35/00; B60K 2370/152; B60K 2370/166; B60K 2370/167; B60K 2370/178; B60K 2370/52; B60K 2370/21; G07C 5/0825; G08G 1/0967; G08G 1/0969; B09G 5/02;
(Continued)

(56) References Cited

U.S. PATENT DOCUMENTS 10,102,747 B2   10/2018   Gage et al.
10,239,526 B2   3/2019   Durgin et al.
(Continued)

FOREIGN PATENT DOCUMENTS

DE   102008042306 A1   4/2010
DE   102010039418 A1   2/2012

*Primary Examiner* — Brent D Castiaux
(74) *Attorney, Agent, or Firm* — Joseph M. Zane; Brooks Kushman P.C.

(57) ABSTRACT

A navigation system for a motor vehicle is provided. A display interface is located in a vehicle. A is processor in communication with a vehicle sensor and a server. The processor is configured to receive vehicle information and road information, predict a traveling direction of the vehicle based on the vehicle information, and highlight the road information associated with the traveling direction on the display interface. A corresponding vehicle and method is also provided. A user of a navigation map can obtain auxiliary information to drive on the current route from a navigation interface more conveniently during the process of using the navigation map, thus providing the user an improved driving experience.

25 Claims, 6 Drawing Sheets

(51) Int. Cl.
*G08G 1/0967* (2006.01)
*G09G 5/02* (2006.01)
*G09G 5/37* (2006.01)
*G07C 5/08* (2006.01)

(52) U.S. Cl.
CPC .. *B60K 2370/166* (2019.05); *B60K 2370/167* (2019.05); *B60K 2370/178* (2019.05); *B60K 2370/52* (2019.05); *G09G 2320/066* (2013.01); *G09G 2320/0666* (2013.01); *G09G 2340/04* (2013.01); *G09G 2380/10* (2013.01)

(58) Field of Classification Search
CPC ............... B09G 5/37; B09G 2320/066; B09G 2320/0666; B09G 2340/04; B09G 2380/10
See application file for complete search history.

(56) References Cited

U.S. PATENT DOCUMENTS

| | | | | |
|---|---|---|---|---|
| 2014/0118168 | A1* | 5/2014 | Lee | G08G 1/096725 340/905 |
| 2016/0159280 | A1* | 6/2016 | Takazawa | G08G 1/165 345/8 |
| 2016/0288789 | A1* | 10/2016 | Durgin | B60W 20/00 |
| 2017/0174132 | A1* | 6/2017 | Yokochi | G06V 20/582 |
| 2017/0232908 | A1* | 8/2017 | Jung | G09F 21/042 296/37.7 |
| 2020/0108833 | A1* | 4/2020 | Sim | B60W 40/072 |

* cited by examiner

NAVIGATION SYSTEM AND DISPLAY METHOD OF A NAVIGATION MAP

CROSS-REFERENCE TO RELATED APPLICATIONS

This application claims foreign priority benefits under 35 U.S.C. § 119(a)-(d) to CN Application 2020 103 642 087 filed Apr. 30, 2020, which is hereby incorporated by reference in its entirety.

TECHNICAL FIELD

The present application generally relates to the vehicle technical field, and more particularly relates to a navigation system and a display method of a navigation map.

BACKGROUND

A positioning navigation system has been developed rapidly in the design and manufacture of modern vehicles, and a positioning navigation device has been universally applied in various types of vehicles to provide a navigation service for users of the vehicles.

When existing navigation systems display a navigation route, they usually show a real-time road condition and a current route planning to drivers, or at the same time provide multiple road information to the drivers in the same display way to assist driving. However, in this case the display of multiple road information can distract the drivers from driving to look for information they needed.

Therefore, there still exists an improvement requirement that can better provide driving auxiliary information for a driver in the prior art.

SUMMARY

Against above background, inventors realize that there is a need for an improved navigation system and display method which can help a user of the navigation system to obtain auxiliary information needed to drive on the current route from a display interface of the navigation system during the process of using the navigation system, and thus provide a better navigation experience for the user.

An advantage of the present application is to provide a navigation system and display method of a navigation map which can assist a user to obtain information necessary for the vehicle travel during the process of using the navigation system to enable the user to obtain a better safety and driving experience.

According to the present application, there is provided a navigation system comprising: a display interface located in a vehicle; a processor in communication with a vehicle sensor and a server and configured to receive vehicle information and road information; and the processor is configured to predict a traveling direction of the vehicle based on the vehicle information and highlight the road information associated with the traveling direction on the display interface.

According to an embodiment of the present application, wherein the vehicle information at least comprises one or more of speed information, acceleration information, steering operation, braking operation, vehicle positions, lane confirmations, navigation information and travel logs; and the road information at least comprises traffic signs and/or traffic signals.

According to another embodiment of the present application, wherein the highlighting refers to changing size, or adjusting color, or adjusting a contrast ratio of the road information associated with the traveling direction on the display interface or a combination thereof or showing the road information associated with the traveling direction on the display interface individually.

According to yet another embodiment of the present application, wherein when the navigation system is operated in a navigation mode, the prediction is made based on the vehicle positions and the navigation information and the traffic signs and/or traffic signals associated with the traveling direction are highlighted on the display interface.

According to yet another embodiment of the present application, wherein when the navigation system is operated in a cruise mode, the prediction is made based on the vehicle positions and the lane confirmations and the traffic signs and traffic signals associated with the traveling direction are shown on the display interface.

According to yet another embodiment of the present application, wherein when the navigation system is operated in a cruise mode, the prediction is made based on the vehicle positions and the steering operation and/or travel logs, and the traffic signs and/or traffic signals associated with the traveling direction are highlighted on the display interface.

According to yet another embodiment of the present application, wherein the display interface is a pop-up hidden window.

According to yet another embodiment of the present application, wherein the hidden window pops up according to the vehicle positions and highlights the road information associated with the traveling direction based on the prediction.

According to yet another embodiment of the present application, wherein the processor is configured to, in response to a parking time of the vehicle is within a range of a preset threshold, cause the vehicle to turn off automatic start/stop functions of an engine of the vehicle automatically or prompt a driver to turn off automatic start/stop functions of the engine of the vehicle manually.

According to yet another embodiment of the present application, wherein the navigation system is an onboard navigation system.

According to another aspect of the present application there is provided a display method of a navigation map comprising: showing the navigation map and vehicle positions; receiving vehicle information and road information; and predicting a traveling direction of the vehicle based on the vehicle information, and highlighting the road information associated with the traveling direction on a display interface.

According to an embodiment of the present application, wherein the vehicle information comprises one or more of speed, acceleration, steering operation, braking, vehicle positions, lane confirmations, navigation information and travel logs; and the road information comprises traffic signs and/or traffic signals.

According to another embodiment of the present application, wherein the highlighting refers to changing size, or adjusting color, or adjusting a contrast ratio of the road information associated with the traveling direction on the display interface, or a combination thereof, or showing the road information associated with the traveling direction on the display interface individually.

According to yet another embodiment of the present application, wherein in a navigation mode, the predicting is made based on the vehicle positions and the navigation information and the traffic signs and/or traffic signals associated with the traveling direction are highlighted.

According to yet another embodiment of the present application, wherein in a cruise mode, the predicting is made based on the vehicle positions and lane confirmations and the traffic signs and/or traffic signals associated with the traveling direction are shown.

According to yet another embodiment of the present application, wherein in a cruise mode, the predicting is made based on the vehicle positions and steering operation and/or travel logs and the traffic signs and/or traffic signals associated with the traveling direction are highlighted.

According to yet another embodiment of the present application, the display method further comprises showing a suggested vehicle speed range based on the vehicle positions, vehicle speed and traffic signals.

According to yet another embodiment of the present application, the display method further comprises issuing a warning signal in response to a speed of the vehicle exceeding the suggested vehicle speed range.

According to yet another embodiment of the present application, the display method further comprises automatically turning off or prompting a driver to manually turn off automatic start/stop functions of an engine of the vehicle in response to a parking time of the vehicle is within a range of a preset threshold.

According to yet another aspect of the present application there is provided a motor vehicle, wherein the motor vehicle has a navigation system, comprising: a display interface of a navigation map located in the vehicle; a processor in communication with a vehicle sensor and a server and configured to receive vehicle information and road information; wherein the vehicle information at least comprises vehicle positions, lane confirmations, navigation information and travel logs, the road information at least comprises traffic signs and traffic signals; and the processor is configured to predict a traveling direction of the vehicle based on the vehicle positions and at least one of the lane confirmations, navigation information, travel logs, and highlight the traffic signs and/or traffic signals associated with the traveling direction on the display interface based on the prediction.

For a better understanding of the present application, reference can be made to embodiments shown in following appended drawings. Components in the drawings are not necessarily drawn to scale and related elements can be omitted, or in some cases the proportion may have been amplified, so that novel features described herein are emphasized and clearly shown. In addition, system components can be differently arranged as known in the art. Furthermore, in the appended drawings, the same reference numbers show the corresponding parts throughout several drawings

DETAILED DESCRIPTION

Figure 1:
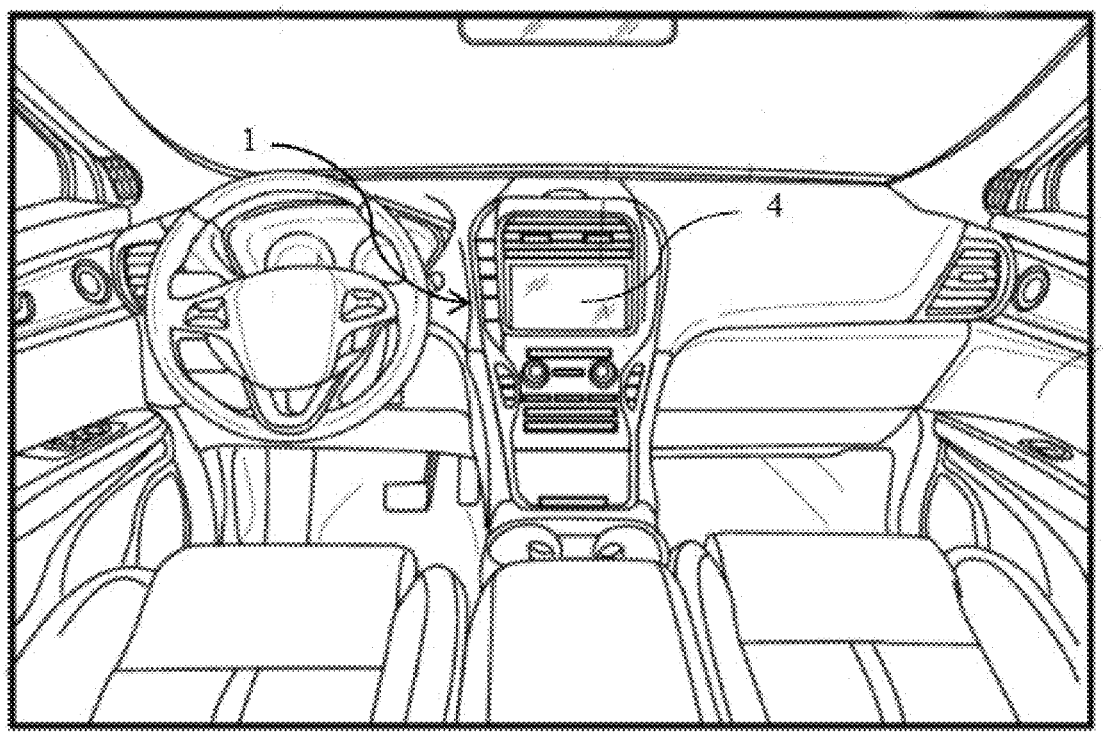
FIG. 1 shows a vehicle cabin of a motor vehicle comprising a navigation system according to the present application.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Embodiments of the present disclosure are described below. However, it should be understood that, the disclosed embodiments are merely examples and other embodiments can take various alternative forms. The appended drawings are not necessarily drawn to scale; some functions may be exaggerated or minimized to show details of the specific components. Therefore, specific structural and functional details disclosed herein are not to be interpreted as limiting, but merely as a representative basis for teaching one skilled in the art to employ the present application in various ways. As will be understood by one having ordinary skill in the art, various features shown and described with reference to any of the appended drawings can be combined with features shown in one or more other appended drawings to produce embodiments that were not definitely shown or described. A combination of shown features provides representative embodiments for a typical application. However, various combinations and modifications of features which are consistent with the teaching of the present disclosure may be desired for some specific applications or implementations.

As mentioned in above background art, during the process of a navigation system of a vehicle providing driving auxiliary information to a driver, due to the excessive amount of information provided, the driver usually needs to pay extra attention to these information, as a result the driver may not be able to concentrate on a driving behavior, thus causing the safety of the vehicle driving to decrease. It can be seen that in current solutions, how to better understand intentions of the driver of the vehicle and thus present the relevant information to the driver of the vehicle have not been valued, which causes the driver or an occupant of the vehicle feel a unsmooth usage experience when they need these information. Thereby, the inventors realize that there is lack of a navigation system and method for judging a driving intention of the driver in real time by gathering the vehicle information and road information to provide the driver with driving auxiliary information he needs. In view of one or more problems in the prior art, the present application provide a navigation system for a motor vehicle and a display method of the navigation system in one or more embodiments that can solve the one or more problems in the prior art.

One or more embodiments of the present application will be illustrated below in combination with the appended drawings. A flow chart illustrates processes executed by the system, it can be understood that execution of the flow chart is not needed to be proceeded according to an order, that one or more steps could be omitted, that one or more executable steps also could be added, and that could be executed in an order or an opposite order, even that one or more steps could be performed simultaneously in some embodiments.

A "driver", "occupant", "passenger", "other client of the same user" and so on are involved in the following embodiments, which are used to illustrate interactions between vehicles and users in one or more embodiments, in some cases, roles can be exchanged or other appellations can be used without departing from the spiritual essence of the present application.

A motor vehicle involved in the following embodiments can be normal gasoline-powered vehicles, hybrid electric vehicles, electric vehicles, fuel cell vehicles and/or any other types of vehicles, and can also be buses, watercrafts or aircrafts. The vehicles include components related to maneuverability, such as an engine, electric motor, transmission, suspension, drive shaft and/or vehicle wheel and so on. The vehicle can be non-autonomous, semi-autonomous (for example some conventional motion functions are controlled by the vehicle) or autonomous (for example motion functions are controlled by the vehicle without a direct input of a driver).

FIG. 1 shows a cabin of a motor vehicle according to the present application, wherein the motor vehicle comprises an onboard management system 1 that comprises a navigation system according to the present application. It can be understood that, the "navigation system" in the present application can show a navigation mode, in which a navigation service is provided to a driver, or a cruise mode, in which the vehicle information and relevant road information are shown to the driver, on a display interface of a display 4, and can also show the vehicle information or road information associated with the vehicle traveling in the form of a pop-up information window when the display 4 shows other applications or setting interfaces.

Figure 2:
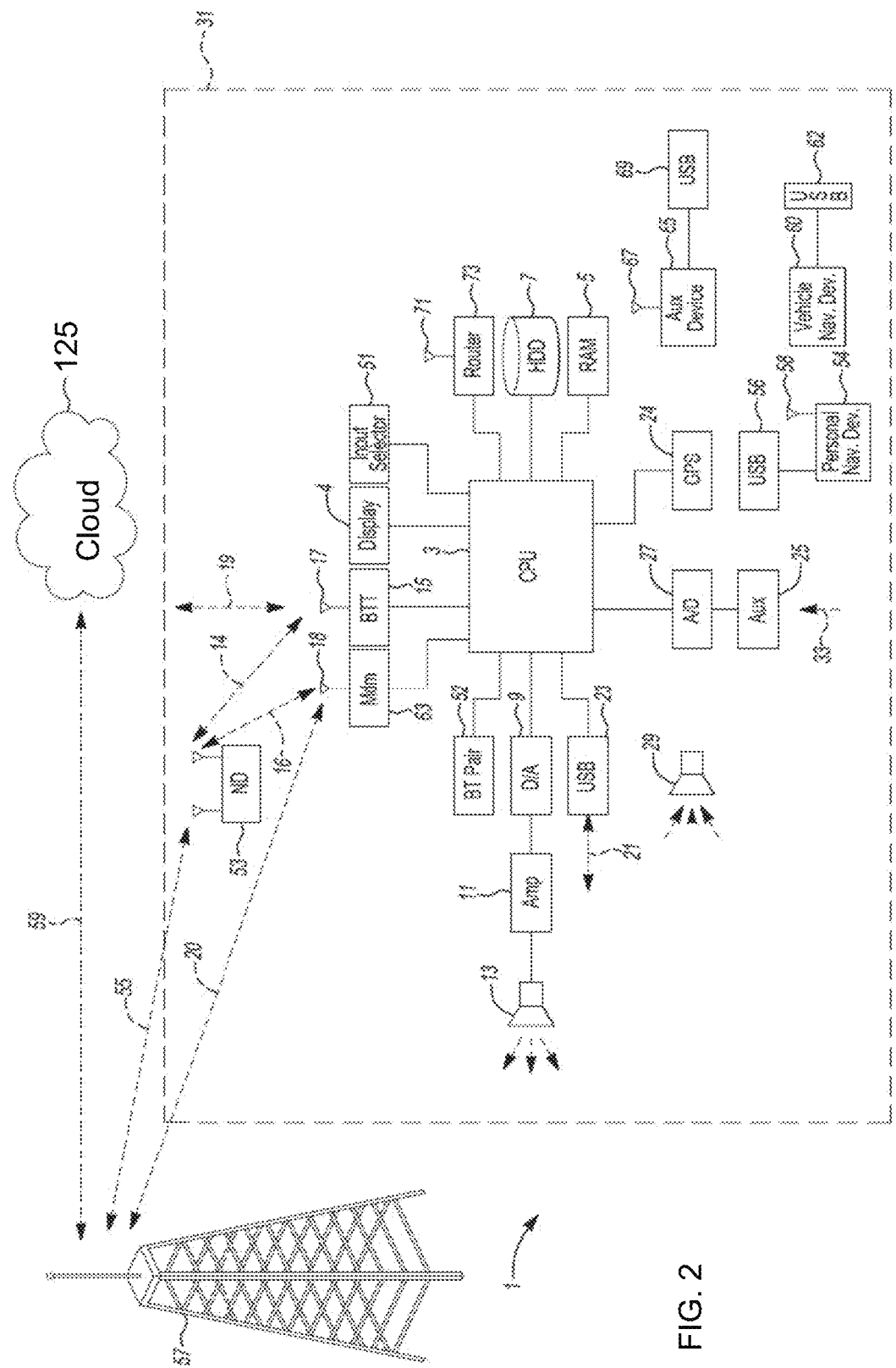
FIG. 2 shows an exemplary block topological graph of an onboard management system according to the present application.
Figure 3:
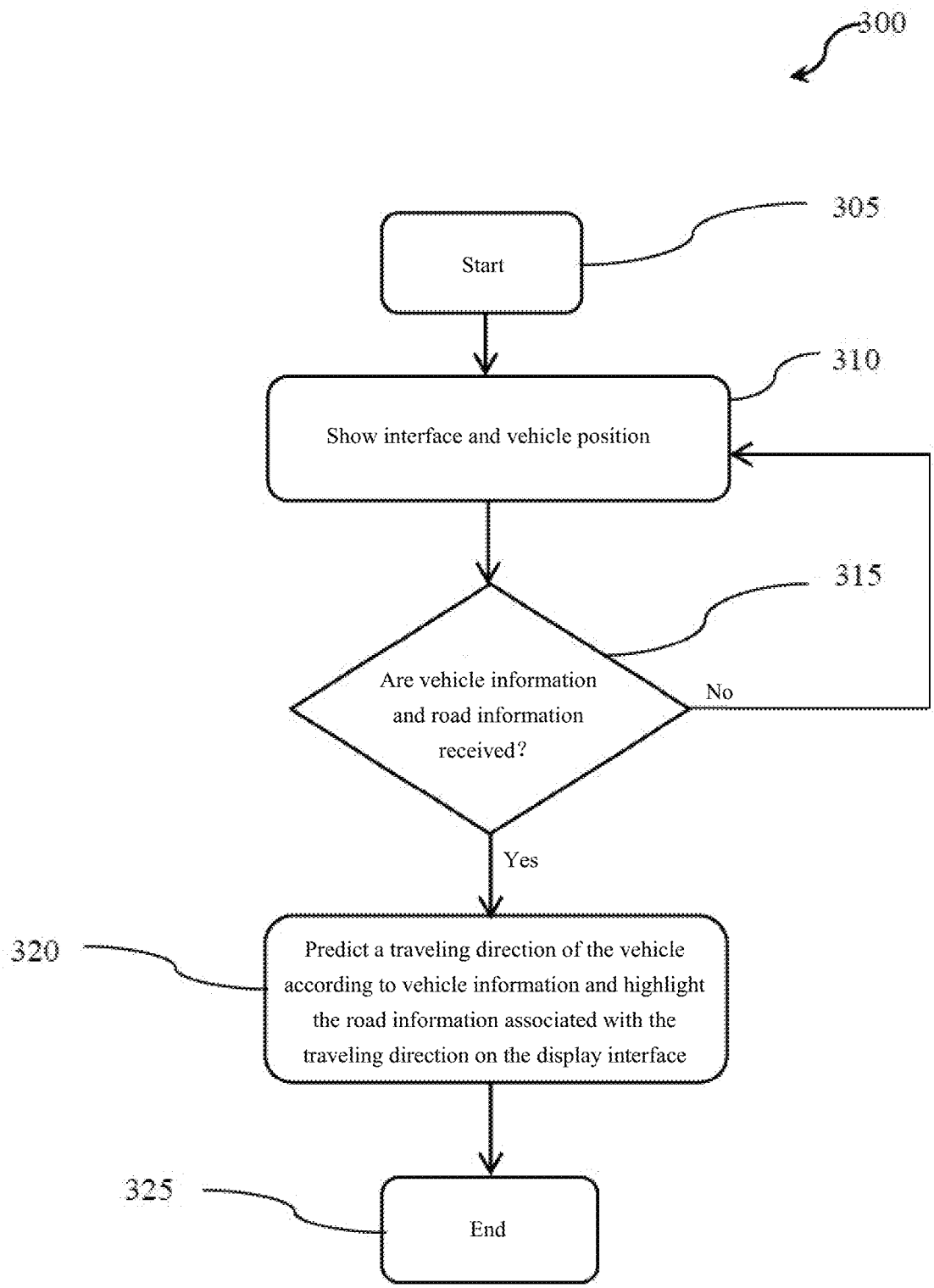
FIG. 3 shows a flow chart of a display method of a navigation map according to the present application.

As further shown in an exemplary block topological graph of the onboard management system 1 in FIG. 2, the onboard management system 1 comprises a processor 3 and a memory 7. The memory 7 stores instructions executable by the processor 3. When the instruction is executed by the processor 3; steps shown in FIG. 3 are implemented.

An exemplary hardware environment used for the onboard management system (also referred as a vehicle computing system VCS) 1 of a vehicle is illustrated in combination with FIG. 2. An example of an operating system built-in the onboard management system 1 is the SYNC system manufactured by the Ford Motor Company. A vehicle equipped with the onboard management system 1 can comprise a display 4 located in the vehicle, such as the display shown in FIG. 1, which can be used to show the navigation interface of the navigation system. The display 4 can be one or more, which presents the vehicle information or the contents interacted with the vehicle individually or in cooperation—for example a display of information associated with the vehicle and vehicle traveling as well as a display and interaction of various applications installed in the onboard management system. For example but not limited, the types of the display can comprise CRT (Cathode Ray Tube) display, LCD (liquid crystal) display, LED (light-emitting diode) display, PDP (Plasma Display Panel), laser display, VR (virtual reality) display, and HUD (head-up/heads up) display. It can be understood that a position of the display may be located within any suitable position of the vehicle, for example but not limited to a center console, or virtually projected to a side window, windshield or other suitable backgrounds of the vehicle.

The processor (CPU) 3 in the onboard management system 1 controls at least a portion of its own operation. The processor 3 can execute an onboard processing instruction and a program, such as a processor executable instruction described against the onboard management system 1 in the present application. The processor 3 is connected to a non-persistent memory 5 and a persistent memory 7. The memories 5, 7 can comprise a volatile memory and a nonvolatile memory such as a read only memory (ROM), a random access memory (RAM), and a keep alive memory (KAM) and so on. Any number of known storage devices (such as a programmable read-only memory (PROM), an EPROM (electrically programmable read-only memory), an EEPROM (electrically erasable programmable read-only memory), a flash memory or any other electronic, magnetic, optical or combined storage device, that can store data) can be used to implement the memories 5, 7. The memories 5, 7 can store such as instructions executable by the processor of the onboard control system 1.

The processor 3 is also provided with multiple different inputs to allow a user to interact with the processor. In an illustrative embodiment, the inputs comprises a microphone 29 configured to receive a voice signal, an auxiliary input 25 (for example a CD (compact disc), a magnetic tape and so on) aimed at an input 33, a USB (Universal Serial Bus) input 23, a GPS (Global Position System) input 24, and a Bluetooth input 15. An input selector 51 is also arranged to allow the user to switch between multiple inputs. Inputs at the microphone and auxiliary connector can be converted from an analog signal to a digital signal via a converter 27 before the inputs are transmitted to the processor. In addition, although not shown, multiple vehicle assemblies and auxiliary assemblies communicated with the onboard management system can use a vehicular network (for example but not limited to CAN (Controller Area Network) bus) to transmit data to the onboard management system 1 (or its assemblies) or receive data therefrom.

Additionally, the processor 3 can be communicated with multiple vehicle sensors and actuators via an input/output (I/O) interface, the input/output interface can be implemented as a single integrated interface that provides multiple raw data or signal adjustment, processing and/or conversion, short-circuit protection and so on. Further, for example but not limited, the types of the sensors in communication with the processor 3 can comprise such as a camera, an ultrasonic sensor, a pressure sensor, a fuel level sensor, an engine speed sensor, a temperature sensor, a photoelectric volumetric pulse wave sensor and so on, to identify an user interaction information such as push button, voice, touch, text input, facial expression or action, hand gesture or action, head gesture or action and body gesture or action, and to identify vehicle information such as fuel level, powertrain failure, in-vehicle temperature and so on.

The outputs of the onboard management system 1 can comprise but not limited to the display 4, a loudspeaker 13 and various actuators. The loudspeaker 13 can be connected to an amplifier 11 and receives a signal from the processor 3 via a digital-analog convertor (DAC) 9. The outputs of the system can also be output to a remote Bluetooth device (for example a personal navigation device (PND) 54) or a USB device (for example a vehicle navigation device 60) along the bi-directional data streams shown at 19, 21 respectively.

In an illustrative embodiment, the onboard management system 1 communicates with a nomadic device 53 of a user (for example a cellular phone, a smart phone, a personal digital assistant and so on) using an antenna 17 of a Bluetooth transceiver 15. And then the nomadic device 53 can communicate with the cloud 125 outside of the vehicle 31 via such as the communication 55 with a cellular tower 57. In some embodiments, the cellular tower 57 can be an access point of the Wi-Fi (Wireless Local Area Network). A signal 14 represents an exemplary communication between the nomadic device 53 and the Bluetooth transceiver 15. The pairing of the nomadic device 53 and the Bluetooth transceiver 15 can be indicated by a button 52 or a similar input, thereby the processor 3 is indicated that the onboard Bluetooth transceiver will be paired with the Bluetooth transceiver in the nomadic device.

Such as a data-plan, data over voice or dual tone multiple frequency (DTMF) tone associated with the nomadic device 53 can be utilized to pass data between the processor 3 and the cloud 125. Alternatively, the onboard management system 1 can comprise an onboard modulator-demodulator (MODEM) 63 having an antenna 18, so that data is passed 16 between the processor 3 and nomadic device 53 via a voice band. Then, the nomadic device 53 can communicate with the cloud 125 outside of the vehicle 31 via such as a communication 55 with the cellular tower 57. In some embodiments, the modulator-demodulator 63 can establish a communication 20 with the cellular tower directly to further use to communicate with the cloud 125. As a non-limiting example, the modulator-demodulator 63 can be an USB cellular modulator-demodulator and the communication 20 can be a cellular communication.

In an illustrative embodiment, a processor is equipped with an operating system comprising an API (Application Programming Interface) which is communicated with an application of a modulator-demodulator. The application of the modulator-demodulator can access an embedded module or firmware on the Bluetooth transceiver 15 to complete a wireless communication with a remote Bluetooth transceiver (for example a Bluetooth transceiver arranged in the nomadic device). The Bluetooth is a subset of the IEEE 802 PAN (personal area network) protocols. The IEEE 802 LAN (local area network) protocols comprise Wi-Fi and have quite a number of cross-functions with IEEE 802 PAN. Both are suitable for communicating wirelessly in a vehicle. Other communication modes can comprise a free space optical communication (for example an infrared data association, IrDA) and non-standard consumer infrared rays (consumer IR) protocols and so on.

In an embodiment, the nomadic device 53 can be a wireless local area network (LAN) device that is capable of communicating via such as the 802.11 network (for example Wi-Fi) or WiMax (Worldwide Interoperability for Microwave Access) network. Other sources that can be interacted with a vehicle comprise a personal navigation device 54 having such as a USB connection 56 and/or an antenna 58, or a vehicle navigation device 60 having a USB 62 or other connections, an onboard GPS device 24, or a remote navigation system (not shown) connected to the cloud 125.

Furthermore, the processor 3 can communicate with multiple other auxiliary devices 65. These devices can be connected via a wireless connection 67 or wired connection 69. Likewise or alternatively, a CPU can be connected to a vehicle-based wireless router 73 by using such as a Wi-Fi 71 transceiver. It can allow the CPU to connect to a remote network within the range of the local Router 73. The auxiliary devices 65 can comprise but not limited to a personal media player, a wireless health device, a mobile computer and so on.

In an embodiment, a flow chart of a display method of a navigation system according to the present application as is shown in FIG. 3. FIG. 3 shows a flow chart 300 of a display method of a navigation map.

In the flow chart 300, the navigation method according to the present application starts from block 305 when a vehicle driver or occupant opens an onboard navigation device. Then, the navigation system shows a navigation interface in a display 4 of the vehicle and shows a position of this vehicle. It can be understood that the dashboard information of the vehicle can be integrated and shown on a navigation interface, for example which can comprise information displays of a speed per hour, a rotational speed, a driving range, gears, a water temperature and various indicator lamps. Furthermore, the next intersection information of a driving route can also be shown on the display interface of the navigation system, display of these information can well enable a driver to obtain the auxiliary information for operating the vehicle from this interface without distracting from other display devices—such as a dash panel and so on. It can be understood that other information that assists the driver in operating the vehicle—for example, the traffic light information of the next intersection that the vehicle is approaching and so on—likewise can be shown on the display interface.

Then, in block 315, an onboard management system 1 continually monitors whether vehicle information and road information are received. The vehicle information can comprise speed information, acceleration information, steering operation, braking operation, vehicle positions, lane confirmations, navigation information and travel logs, and the road information can comprise traffic signs, traffic signal, road features and road associated information. The traffic signs on the road include but not limited to one or more of warning signs, prohibition signs, indication signs, guide signs, tourist area signs and road construction safety signs and so on. The traffic signals include but not limited to traffic lights and gestures of the traffic police, the road features include but not limited to length, width, grade, roughness of the road and obstacles on the road. The road associated information includes, but is not limited to, real-time traffic information, road weather information, accident section information, road monitoring point information as well as information of surrounding vehicles of this vehicle.

The vehicle can use various sensors and vehicle modules that are in communication with the processor 3 of the onboard management system 1—for example an engine speed sensor, a navigation module, a brake sensor, and a memory and so on—to obtain above vehicle information, and can also gather the relevant information on the driving route of the vehicle via sensors that are in communication with the processor 3—such as a camera, an ultrasonic sensor, a temperature sensor, a photoelectric volumetric pulse wave sensor and so on. The vehicle can also communicate with a nomadic device 53 of a vehicle user via an onboard antenna 17, and then communicates with the cloud 125 to obtain the relevant information on the driving route of this vehicle from the cloud 125. It can be understood that other ways of obtaining the road information likewise can be used in the present application and fall within the scope of technical contents claimed by the present application.

In the case of the processor 3 of the onboard management system 1 received relevant vehicle information and road information, the flow proceeds to block 320. If the relevant vehicle information and road information are not received, the flow returns to block 310 to continue to show a current vehicle position on the navigation interface and continue to detect whether the relevant vehicle information and road information are received. In block 320, the processor 3 predicts a traveling direction of the vehicle according to the received vehicle information—for example the vehicle turns to the left, turns to the right or goes straight at the upcoming intersection, then analyzes the received road information based on such prediction and highlights the road information associated with the traveling direction of the vehicle on the navigation interface, thereby enabling the driver to conveniently obtain the road information he needs. The processor 3 can make a prediction for the traveling direction of the vehicle according to the above various types of the vehicle information to determine the road information associated with the traveling direction. In an embodiment, in a navigation mode, the processor 3 can judge the traveling direction of the vehicle according to the navigation information before this vehicle arriving at the intersection ahead, and highlights the road information associated with the traveling direction.

In an embodiment, in a cruise mode, the processor 3 can also predict steering intention of the driver at the upcoming intersection according to the current position of the vehicle and the steering operation of the driver—for example switching on a turn light on one side or operating the steering wheel to turn towards one side and so on, and thereby highlights the road information associated with the traveling direction. In an embodiment, the processor 3 can also predict a traveling direction intention of the driver at the upcoming intersection according to the current position of the vehicle and the lane confirmation information confirmed by the vehicle sensor to the lane in which the vehicle is located—for example the information that the vehicle is in a left turn lane, a right turn lane or a straight lane when approaching the intersection, and thereby highlights the road information associated with the traveling direction. In another embodiment, in a cruise mode, the processor 3 can predict a possible driving direction of the vehicle at the upcoming intersection according to the current position of the vehicle and travel logs of the vehicle stored in the memory of the onboard management system 1—for example this vehicle has a relatively fixed driving route in the corresponding time period of the workday, and thereby highlights the road information associated with the traveling direction. It can be understood that above-mentioned exemplary exposition is merely that the processor 3 judges the traveling direction of the vehicle, other judgment ways for the traveling route and traveling direction of the vehicle likewise can be suitable for technical schemes of the present application and are included within the scope defined by the technical scheme of the present application. Then, one loop of the display method of the navigation map of the present application is ended in block 325.

Figure 4:
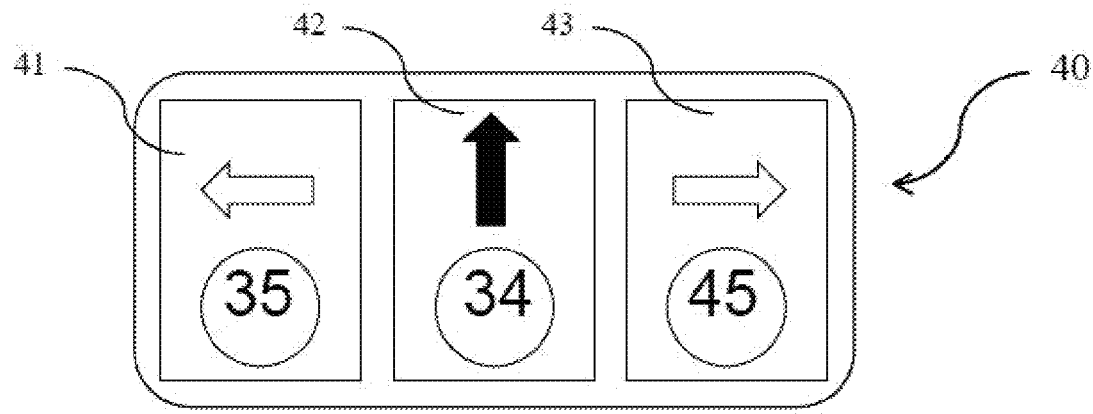
FIG. 4 shows a schematic diagram of an embodiment of a display interface of the navigation map according to the present application.

In an embodiment of the display interface of the navigation system according to the present application as shown in FIG. 4, it can be seen that the display interface 40 of the navigation system comprises three display areas, which are a display area 41, a display area 42 and a display area 43 respectively. It can be understood that redistricting display areas according to the need of the display content is likewise included within the scope defined by the technical scheme of the present application. For example, when the processor 3 predicts that the traveling direction of the driver at the intersection ahead is straight, besides the information shown in the display area 42 can be highlighted, the area of the display area 42 on the display interface 40 can be enlarged and areas of the display areas 41 and 43 are shrunk correspondingly. Real-time statuses of the traffic lights at the intersection ahead are shown respectively in the three display areas. The real-time statuses of the traffic lights can be shown when the vehicle arrives within the range of a predetermined distance or a predetermined time prior to the intersection ahead. It can be seen from FIG. 4, the display area 1 shows that a current status of the left-hand drive is passable, the passable status herein can be shown by a green arrow, and the remaining passable time is 35 seconds. The display area 2 shows that a current status of the straight is impassable, the impassable status herein can be shown by a red arrow, and the remaining waiting time is 34 seconds, but a current status of the right-hand drive of the display area 43 is passable, the passable status likewise can be shown by a green arrow, and the remaining passable time is 45 seconds. It can be understood that, in the intersection that doesn't regulate the right-hand drive, time is no longer marked below the right-hand turn passable status herein, instead the direction is always in the passable status is indicated merely by the green arrow. It can be understood that, a time display in the display area can be hidden in the last few seconds—for example the last 3 seconds, causing the driver focus attention on the traffic lights rather than the display areas when the traffic lights change to avoid the possibility that a possible delayed display of the road information causes the driver violate the indications of the traffic lights. In addition, it can be understood that above-mentioned display ways are merely exemplary, which is not limited to the scope of the technical scheme of the present application. Furthermore, although it is not shown in the drawings, it can be understood that the traffic signs likewise can be shown in a corresponding display area of the above-mentioned display interface 40 according to the prediction of the driver's intention, for example which indicate such as a speed limit sign limited via speed, a warning sign of no left turn of the intersection ahead and a warning sign of slowing down at the intersection and so on associated with the predicted traveling direction.

Figure 5:
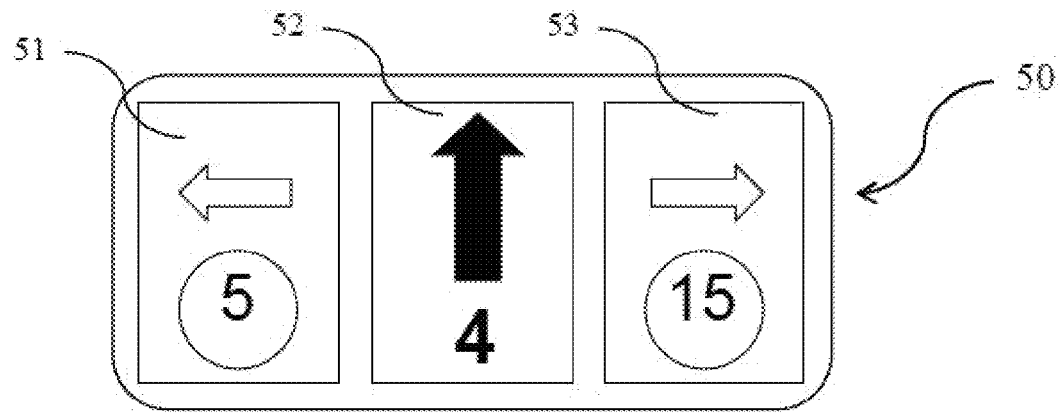
FIG. 5 shows a schematic diagram of an embodiment of the display interface of the navigation map according to the present application.

Next in combination with embodiments shown in FIG. 4 and FIG. 5, when the vehicle is in a cruise mode, the display interface 40 shows the information of the traffic lights of the intersection ahead when the vehicle arriving within the predetermined distance or predetermined time of the intersection ahead, with the vehicle continues to drive closer to the intersection ahead, the processor 3 predicts the possible traveling direction of this vehicle according to the received vehicle information, for example predicting the traveling direction of the vehicle via the vehicle information that if the driver performs steering operation, travel logs of the vehicle and so on. When it is predicted that the vehicle will go straight at the intersection ahead, the display interface 40 converts to a display interface 50, the display interface 50 likewise comprises three display areas, which are a display area 51, a display area 52 and a display area 53 respectively. Wherein, according to a straight direction of the predicted vehicle at the intersection ahead, the display area 52 that shows the information of the straight direction amplifies the information associated with the shown straight direction, so that the driver looks over the amplified road information. Furthermore, because in a cruise mode the traveling direction is a predicted traveling direction namely—possibilities that the driver drives towards other directions can't be completely ruled out, the relevant road information of the left-hand drive and right-hand drive are also respectively shown at normal size in the display area 51 and display area 53 simultaneously. If the driver expects to amplify the display contents of the other two areas, a keystroke or roller wheel on the steering wheel can be operated or a voice command can be issued, the processor 3 amplifies the road information selected by the driver via the navigation system after receiving the relevant command.

Figure 6:
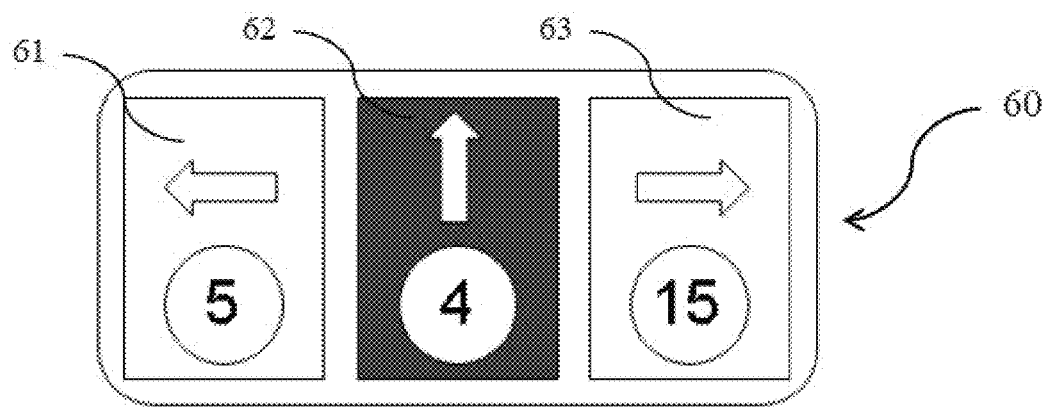
FIG. 6 shows a schematic diagram of an embodiment of the display interface of the navigation map according to the present application.

In addition to the highlight way of amplifying the road information shown by means of FIG. 5, it can also be shown as FIG. 6, changing a base color or a brightness of the base color of the display area 62 of the display interface 60, the road information of the display area 62 is more striking by means of a way that makes an obvious light and shade contrast or a color contrast with the road information shown in the display area 62. And by adjusting the base color or the brightness of the base color of the display area 62, a more obvious visual difference can be formed between the display area 62 and the display area 61 as well as the display area 63, so that the driver can also easily look over during the process of driving.

Figure 7:
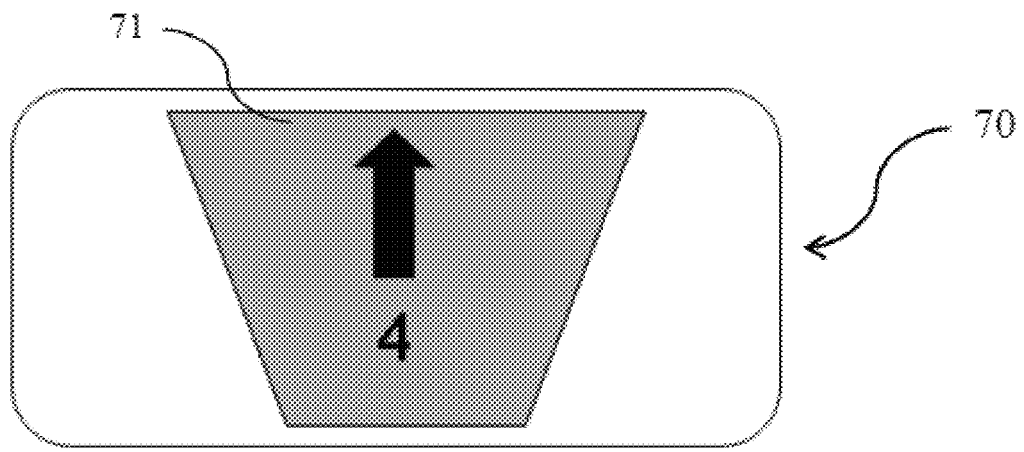
FIG. 7 shows a schematic diagram of an embodiment of the display interface of the navigation map according to the present application.

When the vehicle is in a navigation mode, the processor 3 can accurately judge the traveling direction of the vehicle based on the navigation data before the vehicle arriving at the intersection ahead, and thereby a definite road information indication is provided to the driver. An embodiment of the present application as is shown in FIG. 7, when the vehicle is in a navigation mode, a waiting time in the straight direction is merely shown in a display area 71 of a display interface 70, before the vehicle arriving at the intersection ahead. When the straight direction is a red light, a red arrow can be used to indicate that the straight direction is impassable for a while and the waiting time is shown in digital below the arrow, meanwhile a base color of a road profile of the display area 71 can be displayed by a lighter red than the red arrow to indicate that the road ahead in the current straight direction is impassable, and the base color can be flashed to remind the driver to pay attention. It can be understood that, a passable direction is shown by a green arrow when the road ahead can be passed through, the base color of the road profile of the display area 71 likewise can be displayed by a lighter green than the green arrow to indicate that the road ahead in the straight direction is passable, and the base color can be flashed to make it easier for the driver to notice the passable indication.

Figure 8:
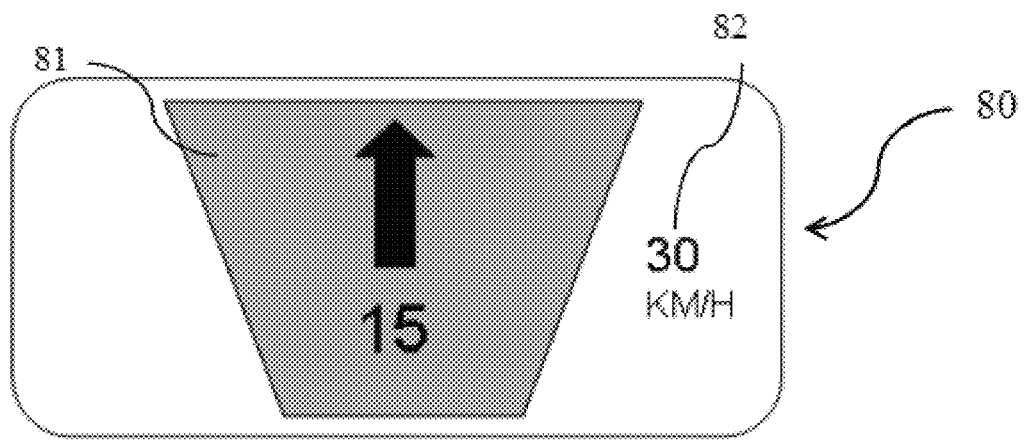
FIG. 8 shows a schematic diagram of an embodiment of the display interface of the navigation map according to the present application.

In an embodiment of the present application shown in FIG. 8, in a navigation mode, besides a display interface 80 shows a state of passage and a waiting time in the straight direction at a display area 81, it can also shows a current suggested vehicle speed at a display area 82. The suggested vehicle speed is calculated according to an obtained current vehicle speed as well as a distance between the vehicle and the intersection by the processor 3 and is shown on the display area 82 in real-time. In an embodiment, if the current vehicle speed exceeds the suggested vehicle speed, the suggested vehicle speed shows in red or flashing red to provide the driver a warning, and the color of the suggested vehicle speed changes to green and stop flashing when the current vehicle speed is within the range of the suggested vehicle speed. It can be understood that the suggested vehicle speed can also be shown in other ways that are capable of giving a warning to the driver, but not only limited to the ways described in above-mentioned embodiments.

When the vehicle is waiting at the intersection, in response to the waiting time being within the preset threshold range, such as it can be 20 seconds or a shorter time in an embodiment, the processor 3 gives instructions to automatically turn off automatic start/stop functions of the vehicle engine or prompt the driver to turn off the automatic start/stop functions of the vehicle engine manually at the display interface of the navigation system to avoid the frequent stops and starts of the engine.

Furthermore, in another example of the present application there is provided a solution of an indication signal conflict. First it can be understood that the gesture of the traffic police is also belonged to the road information of the present application in the case of the gesture can be identified by a vehicle sensor namely—the identifiable gesture of the traffic police is belonged to one kind of the traffic signal. In the case of the current road segment is in traffic stream temporary control or signal light fault, when a sensor of this vehicle detects that a status showed by the signal light of the intersection ahead is different from the information conveyed by the identified gesture of the traffic police, the processor 3 retrieves the preset priority information from the profile of the memory to determine which information of the detected conflict information has a higher priority, such as the gesture of the traffic police is set to have a higher priority than the signal light. In this case, the processor 3 retrieves a corresponding relation between the gesture of the traffic police and the traffic indication information and shows the indication information transmitted by the gesture of the traffic police in the display interface of the navigation system. By the above-mentioned way, the driver can be made to avoid that following the wrong indication causes the situation of violating the traffic laws arise. Furthermore, the processor 3 convers the gesture of the traffic police to the easier understandable indication information after obtaining the gesture of the traffic police and shows the indication information to realize a more convenient guidance of the driver.

Figures 9A, 9B:
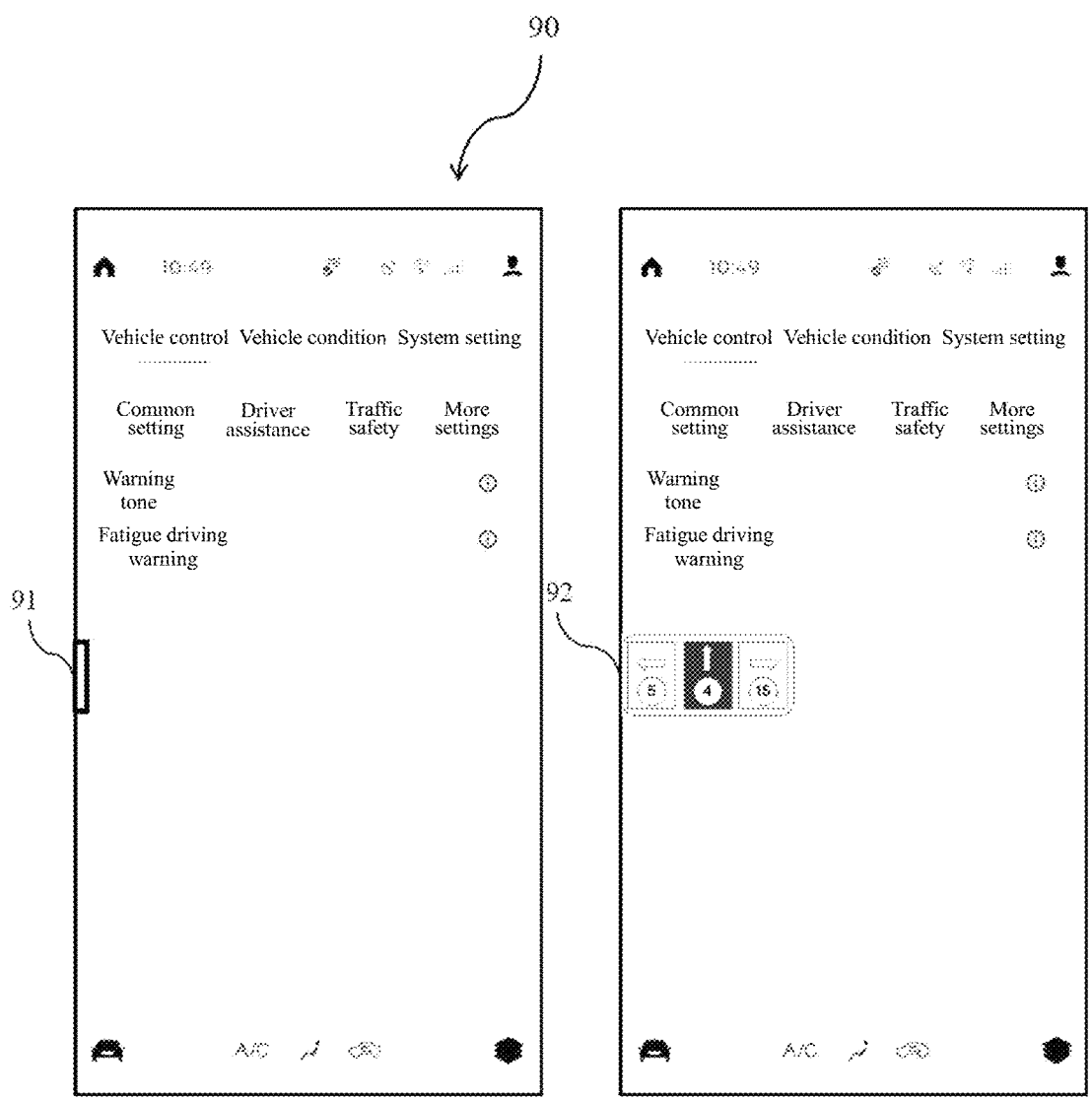
FIGS. 9A and 9B show schematic diagrams of an embodiment of the display interface of the navigation map according to the present application.

In combination with FIGS. 9A and 9B, in an embodiment, an interface 90 shown by a display 3 is not a navigation interface or cruise interface of a navigation system but is a setting interface of a vehicle. In the interface 90, a pop-up window 92 can be popped up from one side of the interface 90 and shows the road information needed by the driver, when the processor 3 predicts the road information needed to be shown according to the received vehicle information. In this embodiment, the shown information is the information of the traffic lights of the intersection ahead. Whether to pop up the pop-up window 92 can be selected according to whether a current position of the vehicle is close to the intersection ahead—for example whether a distance from the intersection ahead is in the range of the preset distance, but when the vehicle not yet arrive at the range of the preset distance, the pop-up window 92 can be retracted on any side of the border of the interface 90 as a tag 91. Furthermore, besides predicting according to the vehicle information and the pop-up window 92 is popped up after the vehicle arrives at the preset distance of the intersection ahead, the pop-up window 92 can also be popped up by clicking the tag 91 on the screen through the driver or is popped up by the keystroke arranged on a steering wheel or a dash panel, the pop-up window 92 can be dragged on the interface 90 by the way that the driver presses the pop-up window 92 and moves it through fingers to change a position of the pop-up window 92. Furthermore, the pop-up window 92 shows the road information of the intersection ahead thereon and shows the road information of the predicted straight direction in the highlight way. It can be understood that the drivers can amend the highlighted contents by means of operating a selective keystroke or a roller wheel arranged on the steering wheel or dash panel according to their own demands, for example the road information of the left side direction can be selected to highlight by means of pressing a left-moving keystroke or roll-left/roll-up a roller wheel. Likewise, the display of the road information of other directions can also be carried out via a way similar to the above-mentioned operation. It should be understood that the above-mentioned display of the road information is an exemplary illustration, other displays of the road information are likewise suitable for above-mentioned technical schemes and included within the scope defined by the present application.

Where it is technically possible, the technical features listed in relation to different embodiments can be combined with each other to form other embodiments within the scope of the present application.

In the present application, the use of a disjunctive is intended to include a conjunction. The use of a definite or indefinite article is not intended to indicate a cardinal number. Specifically, a reference to "the" object or "a" and "an" object is intended to denote also one of a possible plurality of such objects. Furthermore, the conjunction "or" may be used to convey the features that are simultaneously present instead of mutually exclusive alternatives. In other words, the conjunction "or" should be understood to comprise "and/or". The term "comprising" is inclusive and has the same scope as "including".

The above-mentioned embodiments are possible examples of the implementations of the present application, and are given only for the purpose of enabling those skilled in the art to clearly understand the principle of the present application. It should be understood by those skilled in the art that above discussions to any embodiments are merely exemplary, and are not intended to imply that the disclosed scope of the embodiments of the present application (including claims) is limited to these examples; under the overall concept of the present application, technical features in the above embodiments or different embodiments can also be combined with each other to produce many other changes in different aspects of embodiments of the present application that are not provided in detailed description for the sake of brevity. Therefore, any omissions, modifications, equivalent replacements, improvements and so on made within the spirit and principles of the embodiments of the present application shall be included within the scope of protection claimed by the present application.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A navigation system comprising:
a display interface located in a vehicle; and
a processor, in communication with a vehicle sensor and a server, configured to
receive vehicle information and road information associated with a plurality of traveling directions exiting an intersection,
predict a traveling direction of the vehicle from the plurality of traveling directions based on the vehicle information, and
highlight the road information associated with the predicted traveling direction on the display interface.

2. The navigation system of claim 1, wherein the vehicle information includes one or more of: speed information, acceleration information, steering operation, braking operation, vehicle positions, lane confirmations, navigation information, and travel logs; and
the road information includes information with respect to traffic signs and/or traffic signals.

3. The navigation system of claim 2, wherein to highlight the road information includes one or more of: to change size, to adjust color, or to adjust a contrast ratio of the road information associated with the traveling direction on the display interface, or to show the road information associated with the traveling direction on the display interface individually.

4. The navigation system of claim 3, wherein when the navigation system is operated in a navigation mode, the processor is configured to:
predict the traveling direction based on the vehicle positions and the navigation information; and
highlight the traffic signs and/or traffic signals associated with the traveling direction on the display interface.

5. The navigation system of claim 3, wherein when the navigation system is operated in a cruise mode, the processor is configured to:
predict the traveling direction based on the vehicle positions and the lane confirmations; and
show the traffic signs and traffic signals associated with the traveling direction on the display interface.

6. The navigation system of claim 3, wherein when the navigation system is operated in a cruise mode, the processor is configured to:
predict the traveling direction based on the vehicle positions and the steering operation and/or the travel logs; and
highlight the traffic signs and/or traffic signals associated with the traveling direction on the display interface.

7. The navigation system of claim 1, wherein the display interface is a pop-up hidden window.

8. The navigation system of claim 7, wherein the hidden window pops up according to the vehicle positions and highlights the road information associated with the traveling direction based on the prediction.

9. The navigation system of claim 1, wherein the processor is configured to, in response to a parking time of the vehicle bring within a range of a preset threshold, cause the vehicle to turn off automatic start/stop functions of an engine of the vehicle automatically or prompt a driver to turn off the automatic start/stop functions of the engine of the vehicle manually.

10. The navigation system of claim 1, wherein the navigation system is an onboard navigation system.

11. The navigation system of claim 1, wherein the display interface includes first, second, and third display areas, and the processor is further configured to:
responsive to the predicted traveling direction being a first of the plurality of traveling directions exiting the intersection, highlight the first display area;
responsive to the predicted traveling direction being a second of the plurality of traveling directions exiting the intersection, highlight the second display area; and
responsive to the predicted traveling direction being a third of the plurality of traveling directions exiting the intersection, highlight the third display area.

12. The navigation system of claim 11, wherein the processor is further configured to display, in each of the first, second, and third display areas, an indication of whether the respective traveling direction is passible.

13. The navigation system of claim 11, wherein the processor is further configured to display, in each of the first, second, and third display areas that are passible, an indication of the time remaining that the respective traveling direction is passible.

14. The navigation system of claim 11, wherein the processor is further configured to display, in each of the first, second, and third display areas, traffic signs indicated in the road information that are associated with the respective traveling direction.

15. The navigation system of claim 11, wherein the first of the plurality of traveling directions is to turn left, the second the plurality of traveling directions is to proceed straight ahead, and the third of the plurality of traveling directions is to turn right.

16. A display method of a navigation map, comprising:
showing, in a display interface of a vehicle, the navigation map and vehicle positions;
receiving vehicle information and road information associated with a plurality of traveling directions exiting an intersection;
predicting a traveling direction of the vehicle from the plurality of traveling directions based on the vehicle information; and
highlighting the road information associated with the predicted traveling direction on the display interface.

17. The display method of the navigation map of claim 16, wherein the vehicle information comprises one or more of speed, acceleration, steering operation, braking, vehicle positions, lane confirmations, navigation information and travel logs; and
the road information comprises traffic signs and/or traffic signals.

18. The display method of the navigation map of claim 17, wherein the highlighting including changing size, or adjusting color, or adjusting a contrast ratio of the road information associated with the traveling direction on the display interface, or a combination thereof, or showing the road information associated with the traveling direction on the display interface individually.

19. The display method of the navigation map of claim 18, wherein in a navigation mode, the predicting is made based on the vehicle positions and the navigation information and the traffic signs and/or traffic signals associated with the traveling direction are highlighted.

20. The display method of the navigation map of claim 18, wherein in a cruise mode, the predicting is made based on the vehicle positions and the lane confirmations and the traffic signs and/or traffic signals associated with the traveling direction are shown.

21. The display method of the navigation map of claim 18, wherein in a cruise mode, the predicting is made based on the vehicle positions and the steering operation and/or the travel logs, and the traffic signs and/or traffic signals associated with the traveling direction are highlighted.

22. The display method of the navigation map of claim 16, further comprising showing a suggested vehicle speed range based on the vehicle positions, vehicle speed, and traffic signals.

23. The display method of the navigation map of claim 22, further comprising issuing a warning signal in response to a speed of the vehicle exceeding the suggested vehicle speed range.

24. The display method of the navigation map of claim 16, further comprising automatically turning off or prompting a driver to manually turn off automatic start/stop functions of an engine of the vehicle in response to a parking time of the vehicle being within a range of a preset threshold.

25. A motor vehicle, wherein the motor vehicle has a navigation system, comprising:
a display interface of a navigation map located in the vehicle; and
a processor, in communication with a vehicle sensor and a server, configured to
receive vehicle information and road information associated with a plurality of traveling directions exiting an intersection, the vehicle information including vehicle positions, lane confirmations, navigation information and travel logs, the road information including traffic signs and traffic signals for each of the plurality of traveling directions,
predict a traveling direction of the vehicle from the plurality of traveling directions based on the vehicle positions and at least one of the lane confirmations, navigation information, travel logs, and
highlight the traffic signs and/or traffic signals associated with the predicted traveling direction on the display interface based on the prediction.

* * * * *